United States Patent Office 3,149,653
Patented Sept. 22, 1964

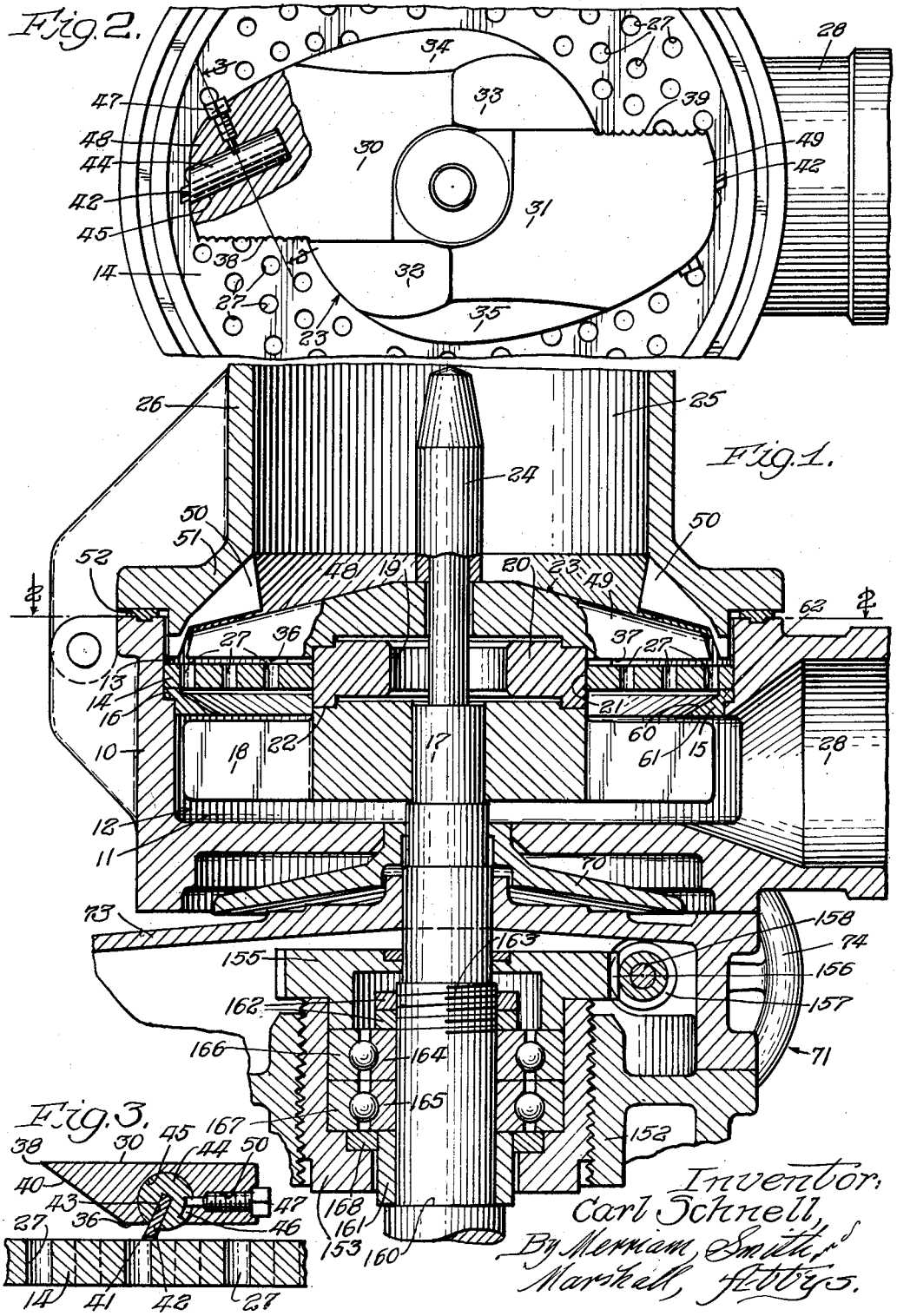

3,149,653
COMMINUTING MACHINE HAVING
VENTURI RING
Carl Schnell, Winterbach, near Schorndorf, Wurttemberg, Germany, assignor of one-half to The Griffith Laboratories, Inc., Chicago, Ill., a corporation of Illinois
Filed Apr. 25, 1961, Ser. No. 105,504
Claims priority, application Germany Nov. 3, 1960
3 Claims. (Cl. 146—192)

The present invention relates generally to comminuting machines and more particularly to a comminuting machine including means for increasing the output of the machine, decreasing the undesirable temperature rise of material processed in the machine, and decreasing the power required to process a given amount of material.

Comminuting machines are useful for comminuting many materials, especially agricultural and animal products such as meat emulsions for preparing sausages and the like. These machines generally include a supply chamber into which material to be comminuted is introduced, a comminuting chamber in communication with the supply chamber and in which the material is comminuted, and a discharge chamber in communication with the comminuting chamber and into which the comminuted material passes incident to ejection from the machine.

Other features and advantages are inherent in the structure claimed and disclosed, as will become apparent to those skilled in the art from the following detailed description in conjunction with the accompanying drawings wherein:

FIGURE 1 is a sectional view of an embodiment of a comminuting machine constructed in accordance with the subject invention;

FIGURE 2 is a sectional view taken along line 2—2 in FIGURE 1; and

FIGURE 3 is a sectional view taken along line 3—3 in FIGURE 2.

A comminuting machine constructed in accordance with the subject invention may have an external appearance typified by that shown in Schnell U.S. Patent No. 2,934,121, issued April 26, 1960.

Referring to FIGURE 1, there is shown a typical embodiment of a comminuting machine constructed in accordance with the subject invention. More specifically, the machine comprises housing wall means 10 extending from transverse wall means 11 together defining a discharge chamber 12 communicating with a comminuting chamber 13, also defined by housing wall means 10 and separated from discharge chamber 12 by a perforate plate 14 resting atop a removably mounted annular suction member or venturi ring 15 supported on a shoulder or ledge means 16 of wall means 10. The function of ring 15 will be described in detail subsequently.

Extending axially through chambers 12 and 13 is a drive shaft 17 powered by motor means (not shown) and rotatably mounting a centrifugal discharge or ejector rotor 18 located in chamber 12. Shaft 17 also extends axially through an opening 19 in a rotor plate 20 located within an opening 21 in perforate plate 20 and having a peripheral lip 22 which rests atop discharge rotor 18. Rotor plate 20 in turn supports a propelling cutting rotor 23 located in comminuting chamber 13. Shaft 17 terminates in a threaded end (not shown) upon which is screwed a cap 24 which bears down against an adjacent surface of cutting rotor 23 and clamps rotor 23, rotor plate 20, and discharge rotor 18 together for simultaneous rotation when shaft 17 is driven by the motive means of the machine.

Comminuting chamber 13 is in communication with an inlet or supply chamber 25 defined by wall means 26. Material to be comminuted is fed initially into chamber 25 from which it flows into chamber 13, where it is comminuted and forced through holes 27 in perforate plate 14 into discharge chamber 12 from which the comminuted material is ejected by discharge rotor 18 outwardly through tangential discharge outlet 28 communicating with the discharge chamber.

The embodiment of rotor 23 shown in the drawings includes two hydrodynamically balanced rotor arms 48, 49. As shown in FIGURE 2, each rotor arm has a surface adjacent inlet chamber 25, said surfaces including respective main surface portions 30, 31, intermediate surface portions 32, 33, and peripheral surface portions 34, 35, all of said surface portions sloping outwardly away from feed chamber 25. Each rotor arm has a flat surface 36, 37, respectively, adjacent perforate plate 14 and spaced therefrom.

As shown in FIGURES 2 and 3, each arm includes a serrated cutting edge 38, 39 constituting the leading edge of its cutting arm when the rotor is rotated in a counter-clockwise sense (as viewed in FIGURE 2) by the normal rotation of drive shaft 17. As shown in FIGURE 3, which depicts arm 48, leading cutting edge 38 constitutes one edge of a face 40 sloping toward perforate plate 14 in a direction opposite the direction of rotation, and terminating at flat rotor arm surface 36. As rotor 23 turns, commestible material is further comminuted by a trailing cutting edge 41 disposed in abutting relation to plate 14 and which skims along the adjacent surface of perforate plate 14.

More specifically, cutting edge 41 constitutes the end of a blade 42 fixed in a slot 43 in a shaft 44 rotatably mounted in a bore 45 extending into the rotor arm. The axis of the bore extends substantially parallel to plate 14 and in a direction as illustrated in FIGURE 2, (e.g. at an acute angle to leading cutting edge 38). The perpendicular distance between plate 41 and the closest point on the peripheral surface of shaft 44 is less than the length of that portion of blade 42 which extends outwardly through the peripheral surface of shaft 44 toward plate 14. Consequently, blade 42 is normally inclined toward plate 14 in the direction of leading cutting edge 38. As the rotor turns and cutting edge 41 skims along the adjacent surface of plate 14, there is a tendency for edge 41 and plate 14 to wear away, thereby creating an undesirable gap between the two. As this occurs, gravity urges blade 42 and shaft 44 in a counter-clockwise sense (as viewed in FIGURE 3) thereby rotating the blade 42 to a new angularly extending position in abutment with plate 14. In this manner cutting edge 41 is always positioned in substantially abutting relation to plate 14 so that the edge will continue to skim along the adjacent surface of plate 14.

Shaft 44 includes a peripheral groove 46 for receiving a pin 47 extending through a second bore 50 in the rotor arm, bore 50 extending transversely to bore 45. The function of pin 47 is to prevent axial displacement of shaft 44 in bore 45 and also to serve as a stop whereby rotation of shaft 44 and blade 43 in a counterclockwise sense, as viewed in FIGURE 3, is terminated when blade 42 is disposed perpendicularly to plate 14.

The above-described structure for automatically adjusting the blade to offset edge wear, also enables the cutting blade to arrange itself in the desired location relative to a perforate plate 14 when the latter constitutes a replacement for a previous perforate plate that has worn out. More specifically, a new perforate plate will tend to be thicker than the worn out perforate plate which it has replaced. Accordingly, the angle at which blade 42 extends in the direction of the leading cutting edge will have to be greater than the angle which it was able to assume with a thinner worn-out perforate plate. This is readily obtained in the subject structure because the rotatable mounting for the knife blade automatically positions it in the desired abutting position when the machine is reassembled.

Referring to FIGURE 1, the comminuting operation is aided by lugs 50 attached to a flared portion 51 of wall means 26, said flared portion 51 being connected to wall means 10 by an air-tight joint including seal means 52.

Removable venturi ring or annular suction member 15, which supports plate 14, comprises a pair of inwardly converging surfaces 60, 61 defining a triangular cross-section. To prevent comminuted material from jamming between ring 15 and plate 14, ring surface 60, adjacent plate 14, slopes inwardly away from said plate. On the other hand, ring surface 61 extends inwardly substantially parallel to plate 14 to obstruct reverse flow in a direction toward the comminuting chamber. Around the periphery of the ring is an integral flange 62 resting on shoulder 16 of wall means 10, and underlying plate 14. The outer peripheral surface of venturi ring 15 is in loose contact with the inner wall surface of discharge chamber 12 around substantially the entire periphery of the discharge chamber. As shown in FIGURE 2, the innermost diameter of ring 15 is substantially smaller than the inner diameter of discharge chamber 12, and less than the outermost diameter of ejector 18. By thus narrowing the orifice at the inlet end of discharge chamber 12, the pressure within the discharge chamber is increased, thereby causing an increased flow of material through discharge chamber 12 and the rest of the comminuting machine. Ejector rotor 18 inside the discharge chamber cooperates with ring 15 to impart a suction at perforate plate 14, there being nothing in the discharge chamber to obstruct flow therethrough during normal operation of the apparatus or to subject material therein to further comminution. This increased flow in turn further decreases any undesirable temperature rise of the comestible material flowing through the machine due to the shorter length of time spent by the material in the machine. A further advantage is a decrease in the power required to operate the comminuting machine.

The following table illustrates the practical advantages derived from incorporating a venturi ring constructed in accordance with the subject invention in a comminuting machine.

|  | Output lbs. per minute | Temperature rise of comminuted material, °F. | Power required, h.p. |
| --- | --- | --- | --- |
| With ring | 181 | 21 | 86.6 |
| No ring | 143 | 30 | 89.7 |
| Do | 161 | 29 | 89.6 |

Referring again to FIGURE 1, located below transverse wall means 11 is a rotary canopy or flinger plate 70 mounted on shaft 17 and intended to protect mechanism situated below the flinger plate from the effects of liquids or the like which might drip or seep from discharge chamber 12. This mechanism may take the form of means for adjusting shaft 17 in an axial direction. Means of this sort is generally conventional in comminuting machines not having the self-adjusting knife blade described above, said conventional adjusting mechanism being used to perform the same function as the self-adjusting blade of the subject invention. In comminuting machines including this self-adjusting mechanism, it is not necessary to have the axially adjusting means 71 for blade adjusting purposes. However, if desired, this mechanism may be included to raise or lower the rotary ejector 18, the rotor 20, or the cutting and propelling rotor 23 for other purposes. Accordingly adjusting means 71 is shown herein but it can be dispensed with so far as blade adjusting purposes are concerned.

Situated below canopy 17 is a housing or wall means 73 having an inner collar portion 152 with an internally threaded opening concentric with shaft 17. A circular threaded box 153 is mounted in said opening. At the top of box 153 is secured a ring 155 having teeth 156 meshing with a worm gear 157 on a shaft 158 carrying a hand wheel 74. Vertical movement of box 153 moves shaft 17. Within box 153 is a double ball bearing structure having inner race portions 164, 165 rigid with shaft 51 and outer race portions 166, 167 rigid with box 153. Shaft 17 has a shoulder 160 on which rests a collar 161. Collar 161, together with locking nuts 162 on a threaded portion 163 of shaft 17 clamps inner races 164, 165 so that said races move with the shaft. Similarly, the outer stationary races 160 and 167 are secured in box 153 in part by the ring gear 150. An oil seal is indicated at 168.

The foregoing detailed description has been given for clearness of understanding only, and no unnecessary limitations should be understood therefrom, as modifications will be obvious to those skilled in the art.

I claim:

1. A comminuting apparatus for meat, said apparatus comprising:
    a comminuting chamber;
    wall means defining a discharge chamber communicating with said comminuting chamber and having an outlet;
    a perforate plate between said discharge chamber and the comminuting chamber;
    a removable annular suction member, having innermost and outermost peripheries, and loctaed substantially entirely within said wall means and defining the entrance to said discharge chamber;
    means in said discharge chamber consisting essentially of rotary ejector means, said rotary ejector means including means for ejecting comminuted material from the discharge chamber in substantially the same condition of comminution as when the material entered the discharge chamber;
    said rotary ejector means including means for promoting flow of material in the direction of said outlet during normal operation of the apparatus;
    said rotary ejector being in axial alignment with said anular suction member;
    the annular suction member being disposed between said ejector and said perforate plate;
    said suction member and said ejector including means cooperating to impart a suction at said perforate plate;
    said suction member having a pair of inwardly converging surfaces, both of which are located inside the inner surface of said wall means and terminate at said inner periphery of the suction member;
    the first of said pair of surfaces being closer to the perforate plate than the other of said pair of surfaces and sloping inwardly away from said plate;
    the annular suction member having an innermost peripheral diameter, constituting the diameter of the entrance to the discharge chamber, and which is less than the outermost diameter of the ejector portion closest to said entrance;
    that part of the inner surface of said discharge chamber most closely adjacent the annular suction member being offset substantially outwardly from the innermost periphery of the annular suction member;
    the ejector portion closest to said entrance extending outwardly, beyond the innermost periphery of the suction member, toward said offset part.

2. A comminuting apparatus as recited in claim 1 wherein:
    said apparatus includes ledge means adjacent said comminuting chamber for supporting said annular suction member;
    and the perforate plate rests atop said member.

3. A comminuting apparatus as recited in claim 2 wherein:
said annular suction member has outwardly projecting flange means extending around the entire periphery of the member and resting on said ledge means;
said plate rests on said flange means;
and the other of said members' surfaces extends inwardly substantially parallel to said plate.

References Cited in the file of this patent
UNITED STATES PATENTS

| | | |
|---|---|---|
| 2,049,920 | McNitt | Aug. 4, 1936 |
| 2,842,177 | Schnell | July 8, 1958 |
| 2,977,056 | Gustke | Mar. 28, 1961 |
| 3,053,297 | Brundler | Sept. 11, 1962 |